United States Patent [19]

Berney

[11] Patent Number: 4,591,126
[45] Date of Patent: May 27, 1986

[54] BASE FOR SUPPORTING AN UPRIGHT POST OF A GARDEN UMBRELLA OR THE LIKE

[75] Inventor: Sheldon Berney, Winnipeg, Canada

[73] Assignee: Reliance Products Ltd., Winnipeg, Canada

[21] Appl. No.: 674,237

[22] Filed: Nov. 23, 1984

[51] Int. Cl.⁴ ............................................. F16M 13/00
[52] U.S. Cl. ..................... 248/524; 248/529; 248/DIG. 9; 248/DIG. 10
[58] Field of Search ............... 248/519, 523, 524, 529, 248/535, DIG. 10, 548, 544, 903, 916, 158, 364, 539; 47/41.13; 52/297, 298; 211/205

[56] References Cited

U.S. PATENT DOCUMENTS

| | | | |
|---|---|---|---|
| 1,631,227 | 6/1927 | See | 248/DIG. 10 |
| 1,982,569 | 11/1934 | Byrd | 52/298 |
| 2,292,505 | 8/1942 | Black | 248/524 |
| 2,613,899 | 10/1952 | Wagner | 248/524 |
| 2,915,620 | 12/1959 | Robinson | 248/524 |
| 3,025,029 | 3/1962 | Thomas | 248/524 |
| 3,038,688 | 6/1962 | Thorburn | 248/523 |
| 3,648,957 | 3/1972 | Bencriscutto | 248/523 |
| 3,794,279 | 2/1974 | Kramer | 248/529 |
| 4,148,455 | 4/1979 | Oliver | 248/524 |
| 4,469,302 | 9/1984 | Stoudt | 248/535 |

FOREIGN PATENT DOCUMENTS

| | | | |
|---|---|---|---|
| 303156 | 1/1918 | Fed. Rep. of Germany | 248/523 |
| 193105 | 12/1937 | Switzerland | 248/524 |
| 391977 | 9/1965 | Switzerland | 248/519 |

*Primary Examiner*—J. Franklin Foss
*Assistant Examiner*—Robert A. Olson
*Attorney, Agent, or Firm*—Stanley G. Ade; Adrian D. Battison

[57] ABSTRACT

A base for a garden umbrella is formed from a lower receptacle portion and an upper lid portion which interconnect with a snap ring around the periphery of an upper wall of the receptacle portion. A plinthe centrally of the lower portion cooperates with a collar centrally of the lid portion to locate a tube which guides the post of the garden umbrella to sit on the plinthe. The assembled base can then be filled with a suitable fluid ballast material.

6 Claims, 3 Drawing Figures

BASE FOR SUPPORTING AN UPRIGHT POST OF A GARDEN UMBRELLA OR THE LIKE

BACKGROUND OF THE INVENTION

This invention relates to a base for supporting an upright post of a garden umbrella or the like.

Various types of bases for this purpose have been manufactured, for example simple concrete forms and various metal frame structures, all of which serve to support the vertical post for the umbrella with the intention of preventing it tipping when knocked or due to wind forces. These arrangements have the disadvantage that either they are insufficiently stable or they are so heavy that they are difficult to transport.

An alternative arrangement which has been manufactured previously is that of a rotationally molded or blow molded hollow body formed from suitable plastics material which can then be filled with a suitable fluid ballast, for example water through a filler cap. Blow molding requires relatively larger amounts of material to make a particular product and is therefore more expensive than other processes. In addition, even though when the ballast has been removed the support is very light it is also very bulky and therefore remains difficult to transport.

SUMMARY OF THE INVENTION

It is one object of the present invention, therefore, to provide an improved base for supporting an upright post for example for a garden umbrella, which can be filled with a suitable fluid ballast material and therefore when empty is very light and yet can be transported very simply and manufactured economically.

According to the invention, therefore, there is provided a base for supporting an upright post comprising a receptacle portion having an underside for standing on a support surface and a post supporting plinthe for receiving a lower end of said post, and a lid portion for covering said receptacle portion so as to define therewith a hollow container having a surrounding wall for receiving and containing a fluid ballast material, said lid portion having a first aperture through which said post can pass for engaging said plinthe and said receptacle and lid portions being formed from plastics material and having cooperating peripheral connecting means by which they can be interconnected.

Preferably the device includes a third portion in the form of a tube which can be supported around the plinthe of the receptacle portion with an upper end located around a collar so the post can be guided by the tube from the collar onto the plinthe. The tube also can prevent the ballast material entering the interior of the tube so that the post cant be removed and reinserted without difficulty.

In addition, the plinthe can provide a first annular outer supporting ledge for receiving a first larger diameter of post and a second inner supporting annulus for receiving a second smaller diameter of post. The collar in the lid portion can include an inner frangible ring which can be broken away when it is required to insert the larger diameter of post.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
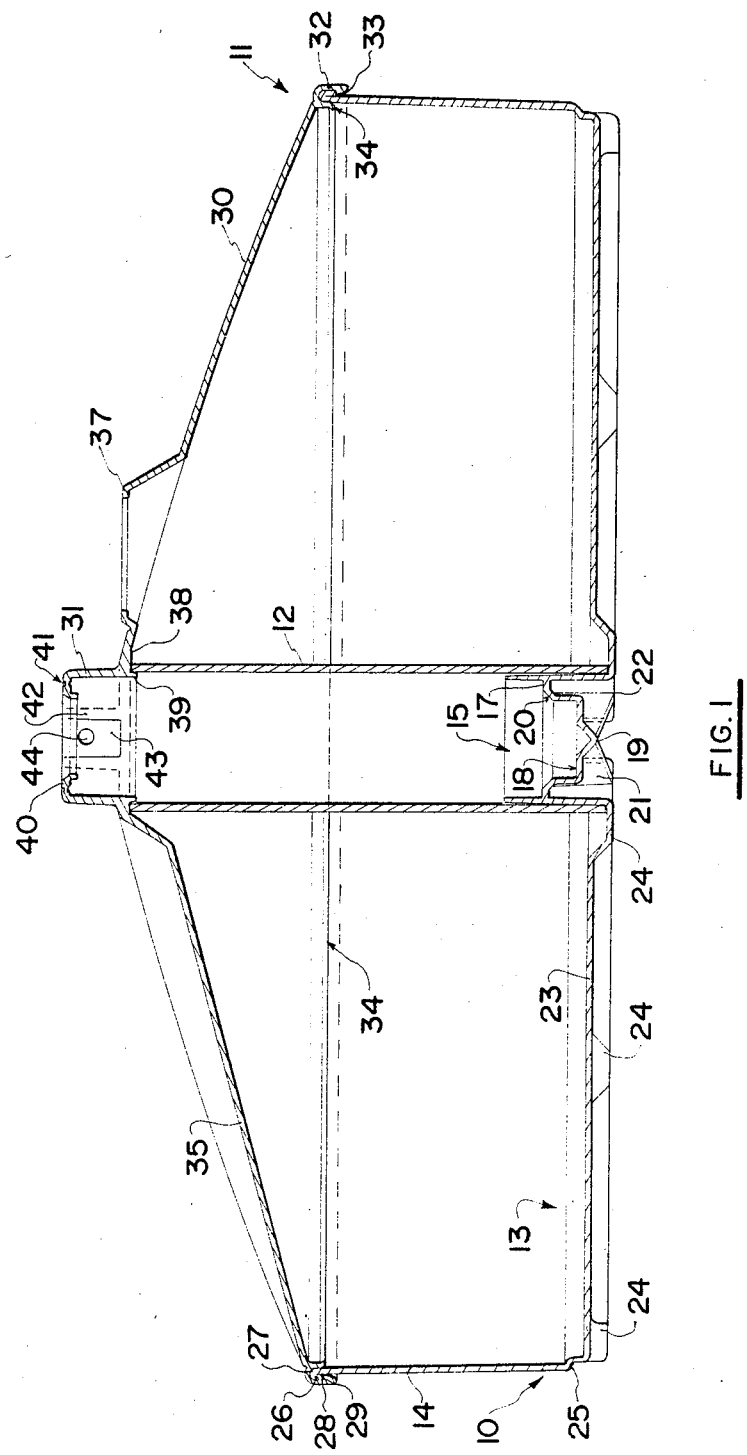
FIG. 1 is a cross-sectional view through a base according to the invention.
Figure 2:
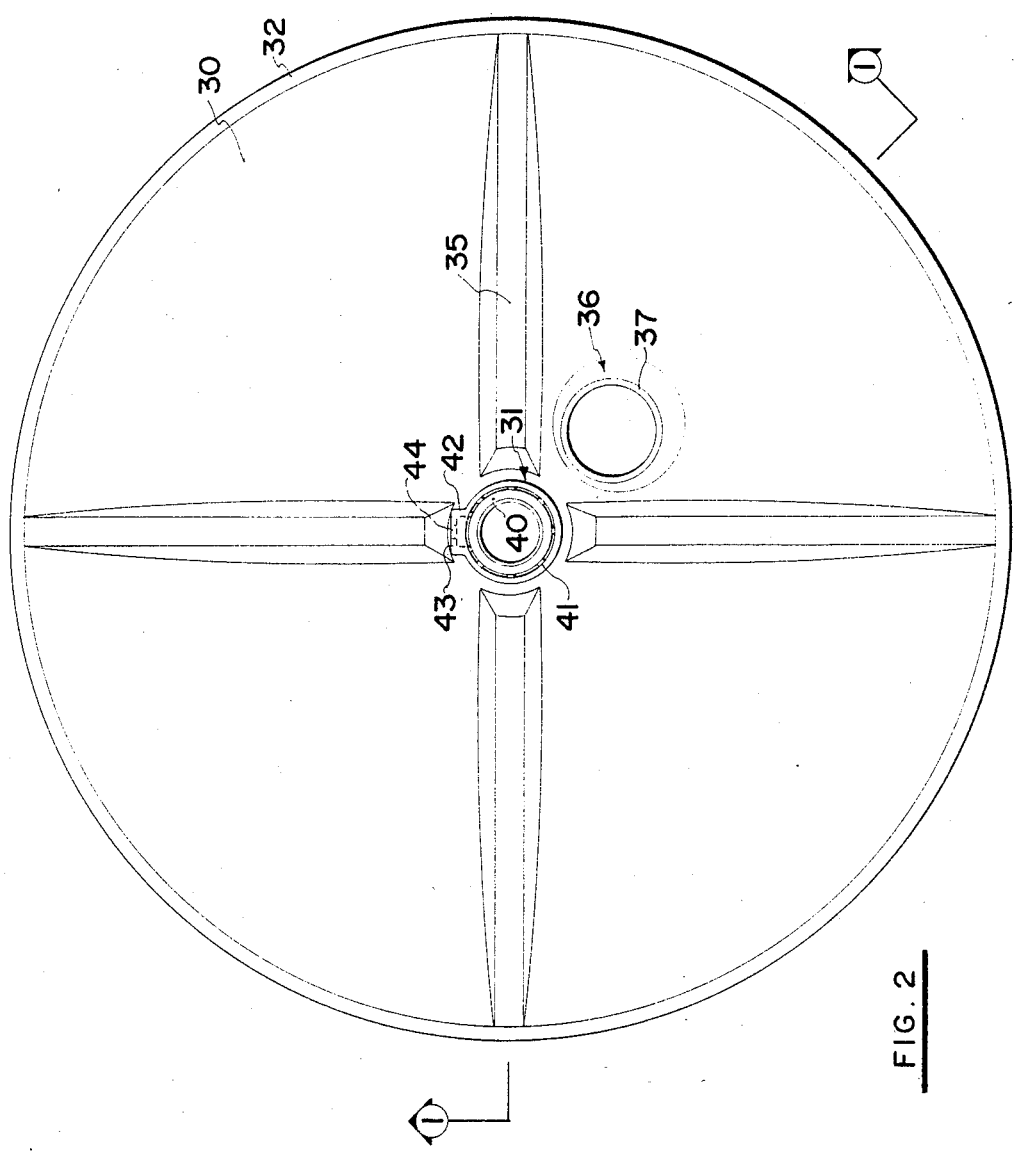
FIG. 2 is a top plan view of the base of FIG. 1.
Figure 3:
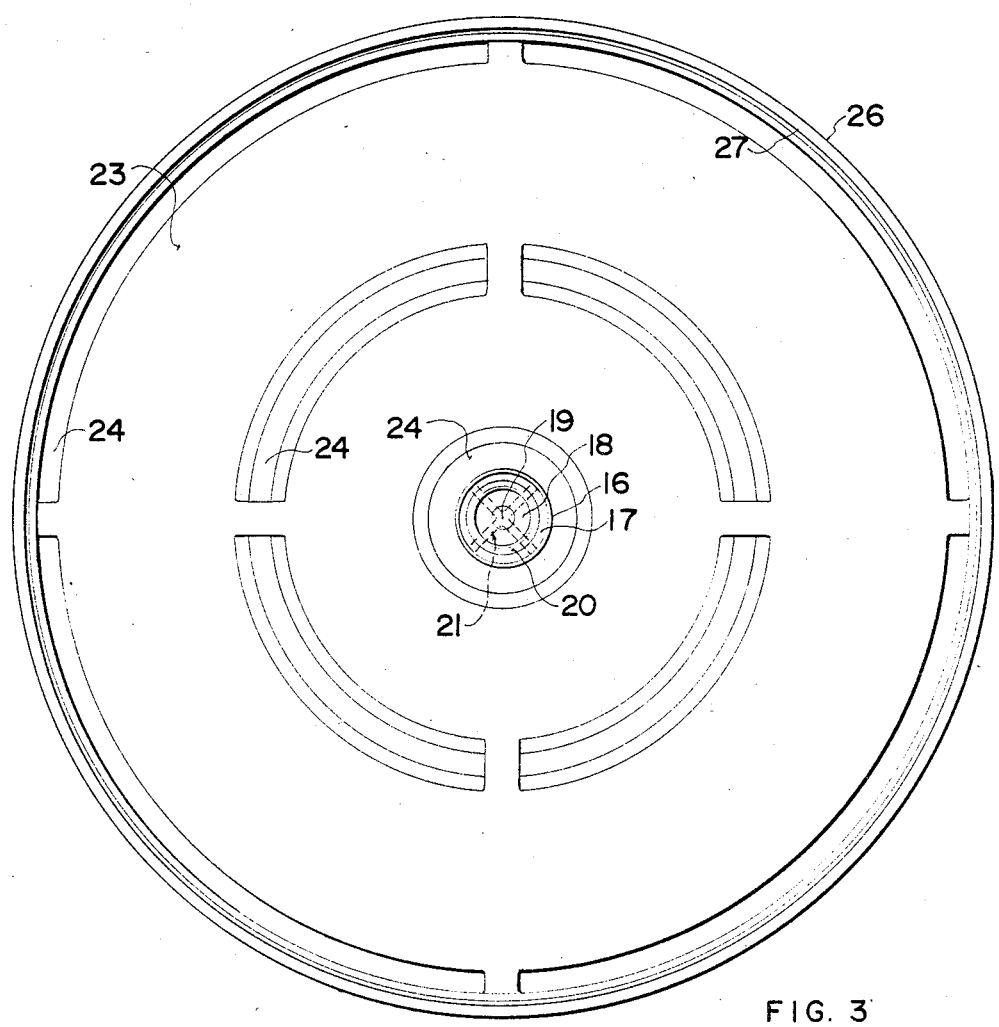
FIG. 3 is a top plan view of the receptacle portion of the base of FIG. 1 with the lid portion removed.

The base as illustrated in the drawings comprises a receptable portion 10 and a lid portion 11 together with a tube portion 12.

The receptacle portion 10 comprises a substantially circular lower wall 13 and an upstanding peripheral sidewall 14 to define a receptacle for a fluid ballast material which may be water or other suitable material. The lower wall 13 includes a central pedestal or plinthe 15. The plinthe 15 comprises an outer collar 16 surrounding a first annular surface 17. A second annular surface 18 inward of the surface 17 and spaced further downwardly toward the lower wall 13 is provided in the plinthe. A central depression 19 is arranged inwardly of the annular wall 18 with the sides of the depression 19 and the interconnecting portion 20 between the annular surfaces arranged on the same line and defining the upper edge of four fins 21 which act to support the annular surfaces relative to a base surface on which the receptacle portion sits. It will be noted therefore that the underside of the fins 21 extends inwardly from the collar 16 to a point 22 from which the lower edge inclines upwardly to terminate at the bottom of the depression 19.

The bottom surface 13 includes a main planar surface portion 23 and three annular or substantially annular depressions 24 arranged co-axially around the plinthe and extending downwardly from the main surface 23 to contact the support surface on which the portion sits. The outer and central depressions 24 are broken at 90 degree spacings around the lower wall. The depressions therefore act to provide strength and stiffening for the lower surface 23.

The outer wall 14 interconnects with the outer depression 24 at a rim 25 and from that position extends upwardly and slightly outwardly to a bead 26 at an upper edge of the wall. The bead is arranged peripherally with a curved upper edge 27 and a sharpened outer edge 28 defined by an upwardly inclined lower surface 29.

The lid portion 11 comprises a generally conical upper wall 30 extending downwardly from a central collar 31 to a snap ring connector 32 at the lower edge of the wall 30 for connection to the bead 26. The snap ring connector is in the shape of an inverted U with a central area shaped to receive the bead 26 and a latch projection 33 extending inwardly from the outer leg of the U so as to snap under the edge 28 when the bead is pressed into position with the U. An inwardly turned edge 34 of the inner leg of the U acts to guide the bead 26 into the correct position within the snap connector. The upper conical surface 30 includes four depressed ribs 35 again arranged at 90 degree spacing around the conical wall to provide strengthening and an attractive appearance. A filler opening 36 is provided in the upper wall 30 between two of the ribs 35 and is frusto-conically shaped so as to define a substantially flat upper surface 37 for receiving a cap (not shown).

The central collar 31 extends upwardly and slightly downwardly from a central annular flat portion 38 of the upper wall. The slightly downward extension provides a flange 39 which cooperates with the outer collar 16 of the plinthe 15 to locate the tubular portion 12. The upper portion of the collar 31 includes an inwardly extending frangible portion 40 which has slots 41 around a weakening line to allow the frangible portion to be broken away.

A pair of upstanding stiffening ribs 42 extend outwardly from the side of the collar so as to support a screw receiving flange 43 which is a screw threaded at an opening 44.

The lid portion 11 and the receptacle portion 10 can be manufactured simply by blow molding from polyethylene plastics material. This is because they are a simple open part as opposed to the conventional hollow part. Furthermore, the lid portion when inverted can be stacked inside the receptacle portion to substantially reduce the dimensions of the product for transportation. Alternatively, a number of receptacle portions can be stacked and the corresponding lid portions separately stacked to yet further reduce the bulk of transportation. The tube portion 12 is a simple extruded part.

When assembling the base for use, the tubular portion 12 is inserted on the outer surface of the plinthe which is slightly tapered so as to receive the tubular portion in a press fit. Subsequently the lid portion is arranged over the tubular portion and pressed downwardly so that the peripheral seal is completed interconnecting the U-shaped snap 32 and the bead 26. At this stage the upper end of the tubular portion 12 is located by the flange 39. The base can then be filled with the fluid ballast material through the filler cap which is then replaced. Due to the press fit between the tubular portion 12 and the collar 16, little if any ballast material enters the area inside the tubular portion 12. A post can therefore be inserted through the collar 31 into the tubular portion and guided thereby to the plinthe 15.

Depending upon the diameter of the post concerned, the frangible portion 40 can remain in position in which case the post passes inside the portion 40 and sits on the lower most annular support ring 18 of the plinthe. A larger diameter of post can be accommodated by breaking away the frangible portion 40 whereupon the post then sits upon the annular ring 17 of the plinthe.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A base for supporting an upright post comprising a receptacle portion having a base for standing on a horizontal support surface, a lid portion for covering said receptacle portion so as to define therewith a hollow container having a surrounding wall for receiving and containing a pourable ballast material, said receptacle and lid portions being formed from plastics material and having cooperating peripheral continuous snap sealing means by which they can be interconnected, the snap sealing means of each of said lid and receptacle portions constituting the portions thereof of greatest distance from a central axis thereof whereby the lid portion and receptacle portion can be formed by injection molding technique, said receptacle portion having integrally formed therein a plinthe defined in the base thereof for supporting a lower end of the post, said plinthe including a first sleeve portion having a central axis thereof vertically upstanding from the base, a first horizontal surface internally of and connected to said sleeve portion at a position above the base so as to extend therefrom to an innermost edge of the surface, a second sleeve portion co-axial to the first sleeve portion and connected to said innermost edge of said first horizontal surface and extending therefrom downwardly to a lowermost edge, a second horizontal surface extending inwardly from said lowermost edge at a position above the base, and fin means extending radially of said central axis to said first sleeve portion and arranged to support said first and second horizontal surfaces, said lid portion having an aperture through which said post can pass for engaging one of said horizontal surfaces of said plinthe depending upon the diameter of the post and a tube portion closely surrounding said first sleeve portion so that one end thereof engages the base, said lid portion having a collar surrounding the aperture providing a lip so as to locate an opposed upper end of said tube portion.

2. The invention according to claim 1 wherein said surrounding wall forms an integral part of said receptacle portion.

3. The invention according to claim 1 wherein the lid portion has a further aperture through which said receptacle portion can be filled with said fluid ballast.

4. The invention according to claim 1 wherein said snap sealing means comprises an inverted U-shaped member on said lid portion and a bead on an upper edge of the wall of the receptacle portion, said bead being arranged such that it can snap into position in said U-shaped member.

5. The invention according to claim 2 wherein said lid portion comprises a substantially conical upper wall with said snap sealing means at a bottom edge of said conical wall.

6. The invention according to claim 1, the collar including an inwardly extending frangible ring for supporting a smaller diameter of post and arranged to break away to allow receipt in said collar of a larger diameter of post.

* * * * *